(12) United States Patent
Thukkaram

(10) Patent No.: US 12,424,009 B1
(45) Date of Patent: Sep. 23, 2025

(54) PROCESSING TECHNIQUES FOR FAST AND ACCURATE IDENTIFICATION OF APPLICATION SCREENS USING OPTICAL CHARACTER RECOGNITION

(71) Applicant: Whatfix Private Limited, Bangalore (IN)

(72) Inventor: Muthukrishnan Thukkaram, Bangalore (IN)

(73) Assignee: WHATFIX PRIVATE LIMITED, Bangalore (IN)

( * ) Notice: Subject to any disclaimer, the term of this patent is extended or adjusted under 35 U.S.C. 154(b) by 305 days.

(21) Appl. No.: 18/060,274

(22) Filed: Nov. 30, 2022

(51) Int. Cl.
  *G06V 30/19* (2022.01)
  *G06T 3/40* (2024.01)
  *G06V 30/14* (2022.01)
  *G06V 30/416* (2022.01)

(52) U.S. Cl.
  CPC ......... *G06V 30/19007* (2022.01); *G06T 3/40* (2013.01); *G06V 30/1444* (2022.01); *G06V 30/416* (2022.01)

(58) Field of Classification Search
  CPC ......... G06V 30/19007; G06V 30/1444; G06V 30/416; G06V 30/41; G06V 30/10; G06V 20/62; G06T 3/40
  See application file for complete search history.

(56) References Cited

U.S. PATENT DOCUMENTS

| | | | |
|---|---|---|---|
| 2008/0172741 A1* | 7/2008 | Reumann | H04L 63/1483 707/999.005 |
| 2022/0319219 A1* | 10/2022 | Tsibulevskiy | G06F 18/40 |
| 2023/0131682 A1* | 4/2023 | Singh | G06F 9/451 382/100 |
| 2024/0161451 A1* | 5/2024 | Kambara | G06V 30/40 |

OTHER PUBLICATIONS

Mande Shen and Hansheng Lei, "Improving OCR performance with background image elimination," 2015 12th International Conference on Fuzzy Systems and Knowledge Discovery (FSKD), Zhangjiajie, 2015, pp. 1566-1570, doi: 10.1109/FSKD.2015.7382178. (Year: 2015).*

K. Vukatana, "OCR and Levenshtein distance as a measure of image quality accuracy for identification documents," 2022 International Conference on Electrical, Computer and Energy Technologies (ICECET), Prague, Czech Republic, 2022, pp. 1-4, doi: 10.1109/ICECET55527.2022.9872824 (Year: 2022).*

* cited by examiner

*Primary Examiner* — Matthew C Bella
*Assistant Examiner* — Janice E. Vaz
(74) *Attorney, Agent, or Firm* — PATENT LAW WORKS LLP

(57) ABSTRACT

A page identification technique is configurable to select regions of a screen for optical character recognition. The size of the regions may be selected to reduce the CPU resources needed to identify a page. Pre-processing and post-processing may be performed to improve the accuracy of the optical character recognition. A word mapping algo- (Continued)

rithm may include logical condition to determine a page name.

12 Claims, 12 Drawing Sheets

PROCESSING TECHNIQUES FOR FAST AND ACCURATE IDENTIFICATION OF APPLICATION SCREENS USING OPTICAL CHARACTER RECOGNITION

TECHNICAL FIELD

The present disclosure is related to determining page information for an application.

BACKGROUND

A digital adoption platform (DAP) is a type of software that is layered on top of another software, app, or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip. Background information on an example DAP implementation is found in various sources, including U.S. Pat. No. 11,372,661 assigned to Whatfix Private Limited, the contents of which are hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators of the product can create content, record a flow, and the content is played back the same flow as and when required when end-user clients navigate the client application. This requires the DAP to find the visual UI elements on the application the user is looking at (e.g., finding where the user's cursor is located on a graphical user interface.

An application may have different pages with different screen element formats. For example, an application may generate graphical user interfaces with pages for different purposes, such as a calendar page, a teleconference page, etc. Also, even for a visual UI for a particular purpose (e.g., document management), there may be a variety of different pages for different features that have variations in the arrangement or display of user interface elements. That is, as a user navigates an application, there may be major changes in the visual UI as well as minor changes in the visual UI. For either case, the DAP needs to know what page the user is looking at to provide the correct smart tip.

Consequently, a DAP needs to know what page the user is looking at to aid in understanding visual UI elements on the application that the user is looking at. Conventionally, identifying pages on a desktop application relies on Automation API Interfaces for different technologies like SAPGUI, UIAutomation, Java Access Bridge etc. However, this is a slow process because uniquely identifying the pages is a memory and CPU intensive task. This makes the process unusable on minimum configuration machines. Some of the problems with these approaches include that each technology like WinForm, SAPGui, Java Swings app needs a different library and algorithm to identify the elements. Additionally, automation APIs are slow and are CPU intensive so identifying context takes time in every technology.

SUMMARY

An apparatus, system, and method for generating page information for an application having a graphical user interface (GUI) utilizes Optical Character Recognition (OCR) to identify words on the page and use the identified words to determine the page. In some implementations, the OCR is performed on one or more selected regions of the page, instead of on the entire page, which reduces CPU demands. In some implementations, pre-processing before OCR is performed to improve the accuracy of the OCR. In some implementations, this may include resizing to increase a font size and performing an operation to distinguish text from its background. In some implementations, post-processing is performed after OCR is performed. One or more other optimizations may also be performed, such as configuring a language for OCR. A configuration engine may be provided for an administrator to configure one or more aspects of the technique. In one implementation, the configuration may include configuring regions for which OCR is to be performed, configuring the language for which OCR is to be performed, and configuring keywords and logical conditions for mapping detected OCR words to identify pages.

An exemplary method includes configuring at least one region of the application screen for OCR, where the at least one region encompasses a screen area no greater than 75% of a maximum screen area. OCR is performed of a screen capture image of the at least one region to detect words found in the at least one region. A page is identified based on a match of the detected words to a word map.

In one implementation, the method further includes performing pre-processing of the screen capture image of the at least one region prior to performing OCR.

In one implementation, the pre-processing includes performing a resizing to increase a minimum font size.

In one implementation, the pre-processing includes combining individual screen capture images of each region of the at least one region.

In one implementation, the pre-processing includes performing at least one operation to distinguish text from a background.

In one implementation, distinguishing text from a background includes grayscale conversion, inversion, and thresholding.

In one implementation, configuring the at least one region includes specifying at least one rectangular region of the application.

In one implementation a language of the OCR is configured.

In one implementation, post-processing is performed of an output of the OCR. In one implementation, the post processing includes generating an array of words.

In one implementation, identifying the page includes mapping a page name to the detected words based on one or more logical conditions.

In one implementation, a page change is identified based on a distance algorithm having a pre-selected threshold of a change in text to define a page change.

In one implementation, the page identification is provided to a digital adoption platform.

In one implementation, a page identification system includes a configuration engine to configure at least one region of an application screen of a graphical user interface of an application for Optical Character Recognition (OCR). In one implementation, the at least one region encompasses a screen area no greater than 75% of a maximum screen area. An OCR module performs OCR of a screen capture image of the at least one region to detect words found in the at least one region. A page identification module identifies a page of the application based on a match of the detected words to a word map.

In one implementation, the page identification system further includes a pre-processing module to perform pre-processing of the at least one region prior to performing OCR.

In one implementation, the pre-processing module performs a resizing to increase a minimum font size.

In one implementation, the pre-processing module combines individual screen capture images of each region of the at least one region.

In one implementation, the pre-processing module performs at least one operation to distinguish text from a background.

In one implementation, the at least one operation comprises performing grayscale conversion, inversion, and thresholding.

In one implementation, the page identification system, further includes a post-processing module to perform post-processing of an output of the OCR to clean up the OCR output and generate an array of words.

In one implementation, the page identification module comprises a mapping module to map a page name to the detected words based on one or more logical conditions.

DETAILED DESCRIPTION

Figure 1A:
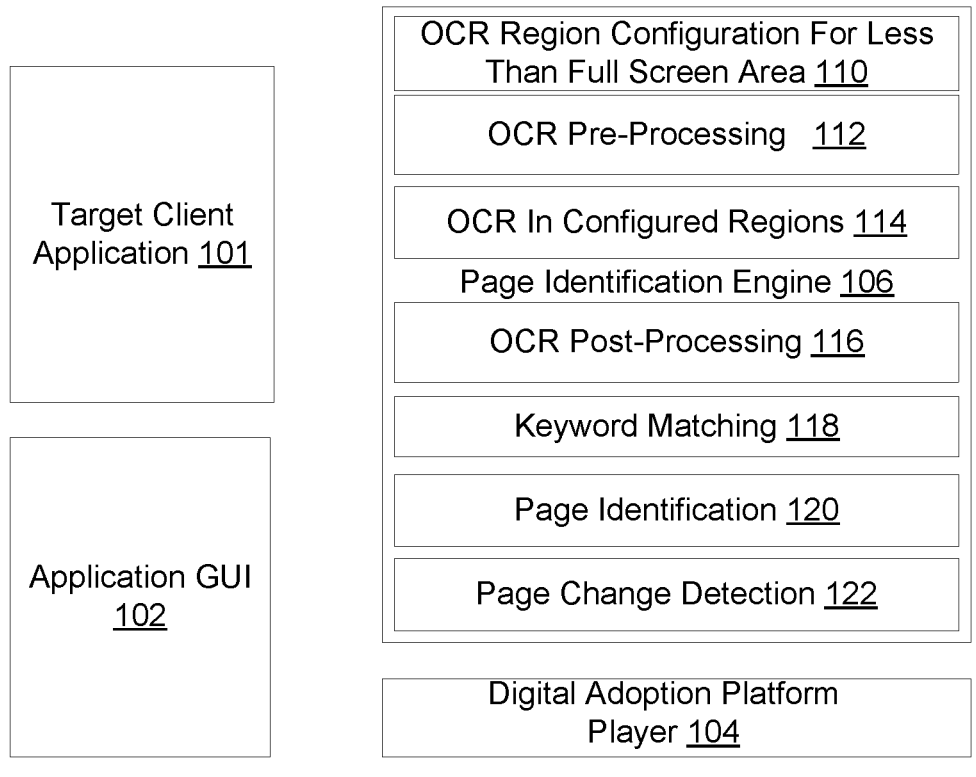
FIG. 1A is a high-level drawing of a technique to identify pages of an application in accordance with an implementation.
Figure 1A:
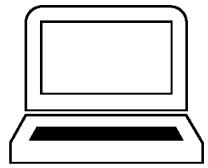

FIG. 1A is a block diagram of a high-level implementation of a technique for generating page information in accordance with an implementation. A target client application 101 running on the desktop of a client computer 100 generates a graphical user interface 102 that may be displayed on a computer display screen of the client computer 100. The target client application may, for example, generate different application display screens with different names (e.g., a calendar screen, a teleconference screen, etc.). Each of the application screens corresponds to a page of the application. Detecting which application screen is being presented to the user on their computer may include identifying a page change and identifying the page of the application that is being displayed on the user's computer display screen.

In an exemplary implementation, a digital adoption platform (DAP) player 104 requires page information to generate smart tips from content providers 108. The DAP is an additional software layer to provide help tips for the target client application.

A page identification engine 106 generates page information that may include page context to identify what page of a graphical user interface 102 of an application 100 a user is looking at. In some implementations, the page information may include a page name. The page information may be provided to the DAP player 104.

The page identification engine 106 uses optical character recognition (OCR) to identify page information. In one implementation, to improve the accuracy of the OCR, an OCR pre-processing module 112 is included to perform one or more operations to improve the accuracy of OCR. Additionally, in one implementation an OCR post-processing module 116 is included to improve the accuracy of the OCR.

In one implementation, to reduce the CPU needs for the OCR, instead of performing OCR on the entire screen, a region configuration module 110 configures one or more regions of a total page screen area for OCR. The total area of the configured regions is less than the total page screen area. For example, in some applications, the words on the page identifying the page tends to be in one or more sections of the page, with many applications having words identifying the page near the top of the screen or along the left side, as two examples. For a given application, the location and size of the region(s) for which OCR is performed may be set to be significantly less than the total screen area.

Instead of performing OCR on a full image capture screenshot of the entire page, the OCR can be performed on a significantly reduced area (e.g., less than 75% of the maximum size of page). In some examples, OCR is performed on less than 50% of a page. In some examples, OCR is performed on no more than 25% of a page. Reducing the total percentage of the screen for which OCR is to be performed is beneficial for CPU resource constrained platforms. For example, if OCR processing is performed on an entire screen image it can make the process of context identification slow, because the bigger the image, the longer the OCR processing time. For example, if a user navigates through the GUI of the application, the screen content could change quickly. In a DAP implementation, it's important that the proper help tips are provided when the screen content changes. Consequently, the OCR process should preferably be implemented to reduce CPU needs to facilitate a pleasant end user experience in terms of the user navigating the GUI and the page identification keeping up with rapid content changes to provide the appropriate DAP help tip. In some cases, the reduced area of the screen image upon which OCR is performed is no greater than 50% of the total screen image. In some examples, the reduce area of the screen image is no greater than 25% of the total screen image.

In one implementation, a keyword matching module 118 is configured to determine, from the post-processed OCR results, a set of matching keywords. The page is identified in page identification module 120, which may identify the page context regarding page attributes (e.g., a calendar page, a chat page, a teleconference page, a data storage page, etc.). In one implementation, the current context of an application (e.g., page name) is identified using the group of keywords present on that page (e.g., words that are user interface elements identified from the OCR). In some implementations, a page change detection module 122 detects page changes. For example, a page change can be identified based on detecting changes in keywords. For example, a selected threshold change in the percentage of keywords may be used to identify a page change. In one implementation an algorithm decides if a particular set or subset of words belongs to a particular application screen. The algorithm may be based on a distance algorithm in which a pre-selected threshold change in the detected word on a page is used to identify a page change. In one implementation, the threshold change in the distance algorithm is set to 50%. When the change in text is at least 50% the algorithm concludes that there is a change in page. The detected words are then used to identify the screen name as provided in the initial configuration.

Figure 1B:
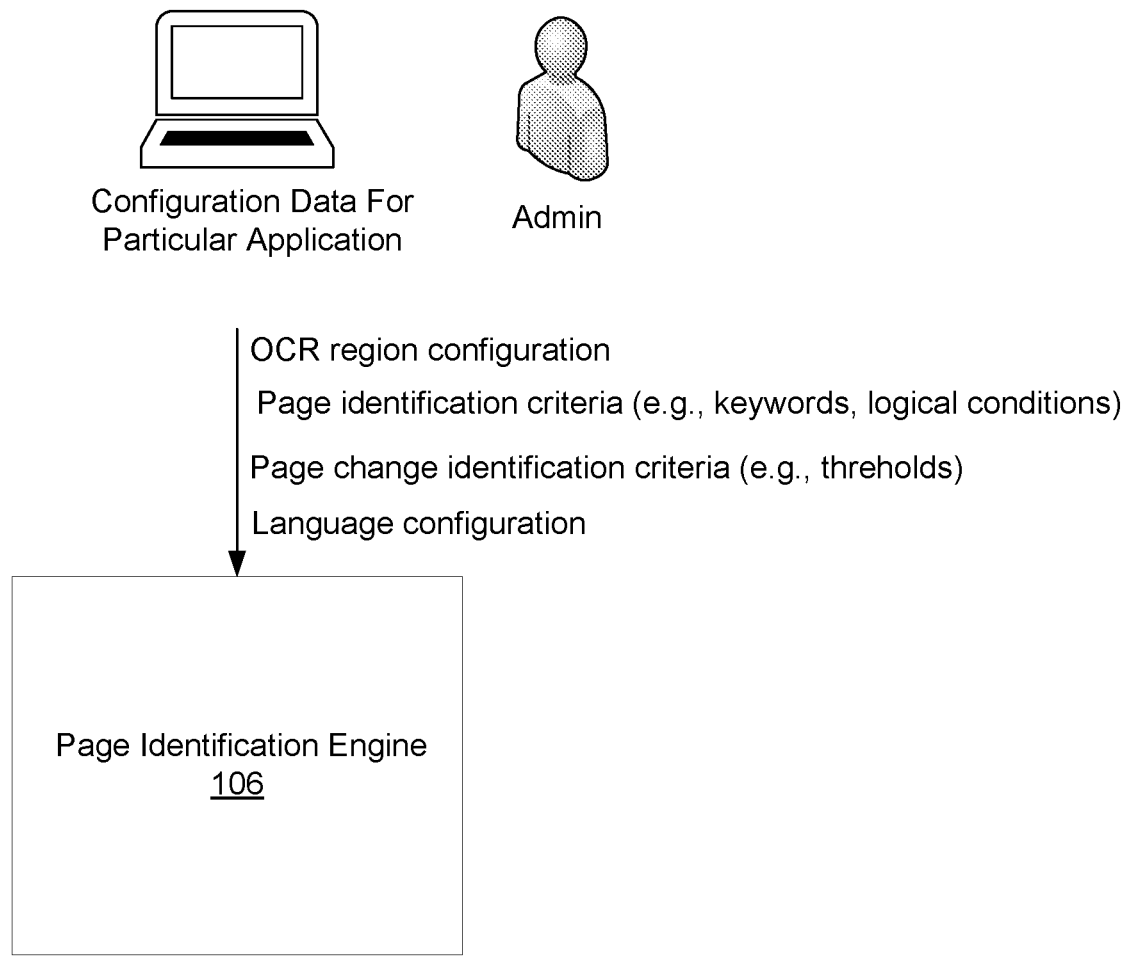
FIG. 1B illustrates an admin user entering configuration settings for page identification in accordance with an implementation.

Referring to FIG. 1B, in one implementation an administrator configures the page identification engine 106 for a particular target application. A particular target application may, for example, have certain sections of the screen that have keywords uniquely identifying the page from other pages of the same target application. The configuration process may include, for example, the configuration administrator selecting one or more settings. The settings may be entered via API commands, a user interface, etc.

In some implementations, the configuration process may include, for example, entering settings for configuring regions of the visual UI for which OCR will be performed. In one implementation, the configuration set by the admin user defines a set of bounding regions of the page using a percentage of the whole application. In one implementation, one or more rectangular regions are defined with respect to a starting point on the screen with respect to a percentage of the screen with respect to one corner (e.g., a top left corner as one option, such as specifying an starting point offset in terms of a percentage of the screen from the left edge and the top edge of the screen as one example) and a regional area corresponding to percentage of the screen width and a percentage height of the screen). That is, regions may be defined by an offset position with the relative percentages of screen width and screen height defining the area of the region with respect to the total screen area (e.g., left 33%, top 0%, width 33%, height 100%). In some implementation, an admit enters the percentages. However, more generally a user interface visualization could be provided to aid in configuring regions to perform OCR.

For example, for a particular application, some portions of the screen may be more relevant to identifying the page than other sections. For example, in some applications, GUI information uniquely identifying the page may be present in a top band of the screen, a bottom band, a middle band, or other portions of the application. Configuring screen regions for OCR reduces the time required to perform OCR for a given hardware/software platform. It has a lower CPU footprint. As an illustrative example, in some implementations the OCR runs extremely fast and returns words for the configured regions within milliseconds. In some implementations, the admin can input simple coordinate and percentage configuration commands to specify the regions.

In some implementations, the administrator may also configure the language of the client application (e.g., Spanish, Italian, German, English, Chinese, Japanese, etc.) or otherwise set a condition (such as geographic location) from which the language of the client application can be inferred. For example, many Microsoft® applications support different languages for different regions of the world. An OCR engine performs poorly in terms of performance and accuracy if it must identify the language before loading the appropriate language model for identifying the words. If the language is provided during the initialization of the OCR engine, the correct language model may be pre-loaded by the OCR. The performance is significantly improved. Since the configuration admin is aware of the language of the application, the language value can be provided to the OCR engine as part of the configuration as shown below:

In one implementation, the administration may configure page identification criteria, such as selecting logical conditions for when the detection of keywords identifies a page. In some implementations this may include selecting criteria for identifying page changes, such as selecting thresholds for a percentage change in keywords that determines if a page change has occurred.

In one implementation, the configuration administrator creates a matcher which will uniquely identify the page using selected keywords. For example, the matcher may be implemented as a map of a Page_Name and a Set_Of_Words which needs to be created manually once by the person who knows about the application. In some implementations, the administrator may configure the matcher to identify a page by a particular screen name (e.g., "Chat").

A sample matcher example is given below in which pages may be matched to Teams, Calendar, Activity, Chat, Calls, Wiki, Apps, New Meeting, or Task Planner based on matching certain words.

```
const page_map={
    'Teams': ['Teams', 'Meeting'],
    'Calendar': ['Calendar'],
    'Activity': ['Feed'],
    'Chat': ['Chat', 'Pinned'],
    'Calls': ['Calls', 'Phone', 'Contacts'],
    'Wiki': ['Wiki', 'Personal', 'Recent'],
    'Apps': ['Search', 'Apps'],
    'New Meeting': ['New meeting', 'Details'],
    'Task Planner': ['Tasks by Planner' ],
}
```

In one implementation, the map can be created by a configuration administrator looking at the application region and identifying the words on the page which are unique. Some words may be unique to a particular region of a page of the application. In other cases, certain combinations of words may be unique. More generally a mapping structure with logical conditions may be defined to identify logical conditions in which the words detected by OCR uniquely identify a page. The structure is chosen to be a map because it helps in creating a direct one to one mapping of an identifier of the page and the words associated with the page. The map structure helps in taking care of a wide variety of logical operations to conclude if the words belong to a particular page. Some examples of the logical conditions that can be defined include the following examples:

1) The Page is matched if all words are matched;
2) The Page is matched if some words are matched (e.g., a selected minimum number);

3) The Page is matched if all words are matched in the exact sequence as mentioned in the list; and 4) The Page is matched if any of the words are matched.

More generally, the logical condition could include other logical possibilities, including determining a page is not matched if it matches some words but has one or more words that would disqualify the match.

Note that a region in which OCR is performed will have a set of found words but not all of these found words need to be used for page matching. Some words do not aid in uniquely identifying page, such as some words used on multiple pages of an application It will be understood that additional tools could optionally be used to aid a configuration administrator to analyze pages of an application, identify keywords words, and identify logical conditions to uniquely identify a page.

While a configuration administrator can create the matcher, more generally it will be understood that software tools could be utilized to aid the administrator to define logical conditions to increase their efficiency at identifying unique words on individual pages and generate logical matching conditions to distinguish between different pages of an application.

The page once matched, can be used as key in combination with other relevant rules, to show relevant DAP content when the page identification technique is used in a DAP. For example, if the Page is identified as a "New Meeting" Page, that information can be used as a key into other information created for the "New Meeting" Page to identify what section of the New Meeting page the user is looking at and generate the appropriate smart tip via the DAP.

In some implementations, page change criteria are configured by an admin. For example, sometimes different pages differ slightly regarding the regions in which OCR is performed. In some cases, different pages may differ by only a few words in the regions in which OCR is performed. In one implementation, a threshold is defined in a distance algorithm to mark the state of the page as changed. As an illustrative example, the threshold may be set at 50%, which means that more than 50% of the words must change between the previous results and the current result of the OCR process. More generally, other threshold values may be selected. While using a threshold criteria is one example of identifying a page change, more generally other approaches could be used. As an example, if other attributes about the application are accessible, these may be used as an additional source of information in making decisions identifying page and identifying page changes.

In some implementations, the captured smaller regions are combined into a single larger image before applying other pre-processing steps to the image.

As one example of pre-processing that may be implemented to be configurable is resizing a screenshot to achieve a minimum font size. For example, the font size of some applications has small fonts in some portions of the screen. As an example, many applications have small fonts that by default are less than 14 or 10 px/dpi in size. In such cases during OCR processing the accuracy of word recognition is reduced. As an illustrative but non-limiting example, the pre-processing could resize by a factor of 1.5. However, more generally the resizing could be smaller or greater factor (e.g., 1.25, 1.5, 1.75, 2.0, etc.). Resizing the screenshot increases OCR accuracy, but the benefits will depend in part on what the minimum default font size is for a particular application, as well as other factors such as the font type and the language of the application. (e.g., the benefits for resizing a character-based language like Chinese may be different than resizing text written in the English alphabet). In some implementations, an administrator may determine a minimum default font size of an application and configure a resizing factor to improve OCR accuracy during initialization.

While an administrator could configure the resizing, more generally in some implementations the resizing is automatically adjusted based on feedback from postprocessing. For example, if the post-processed OCR has nonsensical words or other errors, that may be the result of low OCR accuracy, which in turn may be a result of the font size being too small. In some implementations, a loop in the process may include automatically resizing upon detection of a condition indicative of the types of inaccuracies generated when OCR is performed on a font that is too small.

The pre-processing prior to OCR may include performing pre-processing to make it easier for the OCR to distinguish text from its background. There are examples of applications in which the text is written as white text on a black background. This can make OCR less accurate. Black text on a white background is better for OCR accuracy. There are similar issues with colored text of a first color on a background of a different color. In one implementation, the pre-processing converts the image to grayscale, and then performs thresholding and binarization. The thresholding is selected to achieve a clear differentiation between the foreground and the background, where the foreground is the portion of the image containing text and the background is the non-text region.

An example of post-processing after OCR is now described. OCR typically generates a single big sentence with all the found words separated by spaces and tabs to match the actual positions of the words in the image. This big sentence contains misspelled words, unwanted special characters, and connected adjacent letters. This can be cleaned up and converted into an array of words. The array of words can be used for page identification system. Below is an example list of steps involved in the post-processing in one implementation:

1. Remove all special characters and single letter characters, such as commas, dot, slash, apostrophe, etc.
2. Replace all consecutive multiple spaces with a single space.
3. Execute a spell checker. A spell checker can Identify combined letters and separate them out. If the spell checker is not able to accurately separate the words, then the image resize factor should be increased. In some implementations, this is done automatically when the spell checker is unable to accurately separate words.
4. Convert the sentence into an array of words using space as the separator.

Various optimizations may be performed on the post-processing. For example, a custom spell checker may be provided to include special words used by a target application. For example, a target client application may use proprietary product names.

While a static configuration may be used in which an administrator configures settings once in an initialization step, more generally dynamic configuration may also be employed. As one example, at least some attributes of the configuration may be dynamically varied. To the extent the page identification can access additional attributes of the target application and the platform, the configuration may be dynamically adjustable. For example, the demands on the CPU may vary depending on what software application a user is running and the processing power of their CPU. If CPU demand is low, the page identification process might be adapted to perform OCR on a larger percentage of the screen. As another example, if page attributes are available, such as a page title, the configuration may be adapted to account for the presence of additional information from which to perform page identification.

In some implementations, the processing of OCR is done in a repeating loop until either the DAP player 104 quits or the target client application 101 quits. In some implementations, a configuration administrator sets the time value of the loop to achieve a balance of objectives and provide a good end user experience. As an example, an exemplary loop time is 2000 ms. Reducing the loop time provides an improved user experience up to a certain point, but then diminishing returns set in and CPU needs increase. The CPU needs will also depend on the size of the regions upon which OCR is performed. The loop period should be set so that the end user gets the latest information about the current page when the user navigates the application or changes context. The periodicity of the repeating loop may be empirically selected based on empirical measurements about the best tradeoffs for different target hardware and software platforms. Additionally, the period may be adjusted based upon the size of the region upon which OCR is performed, to account for differences in CPU needs.

Figure 2:
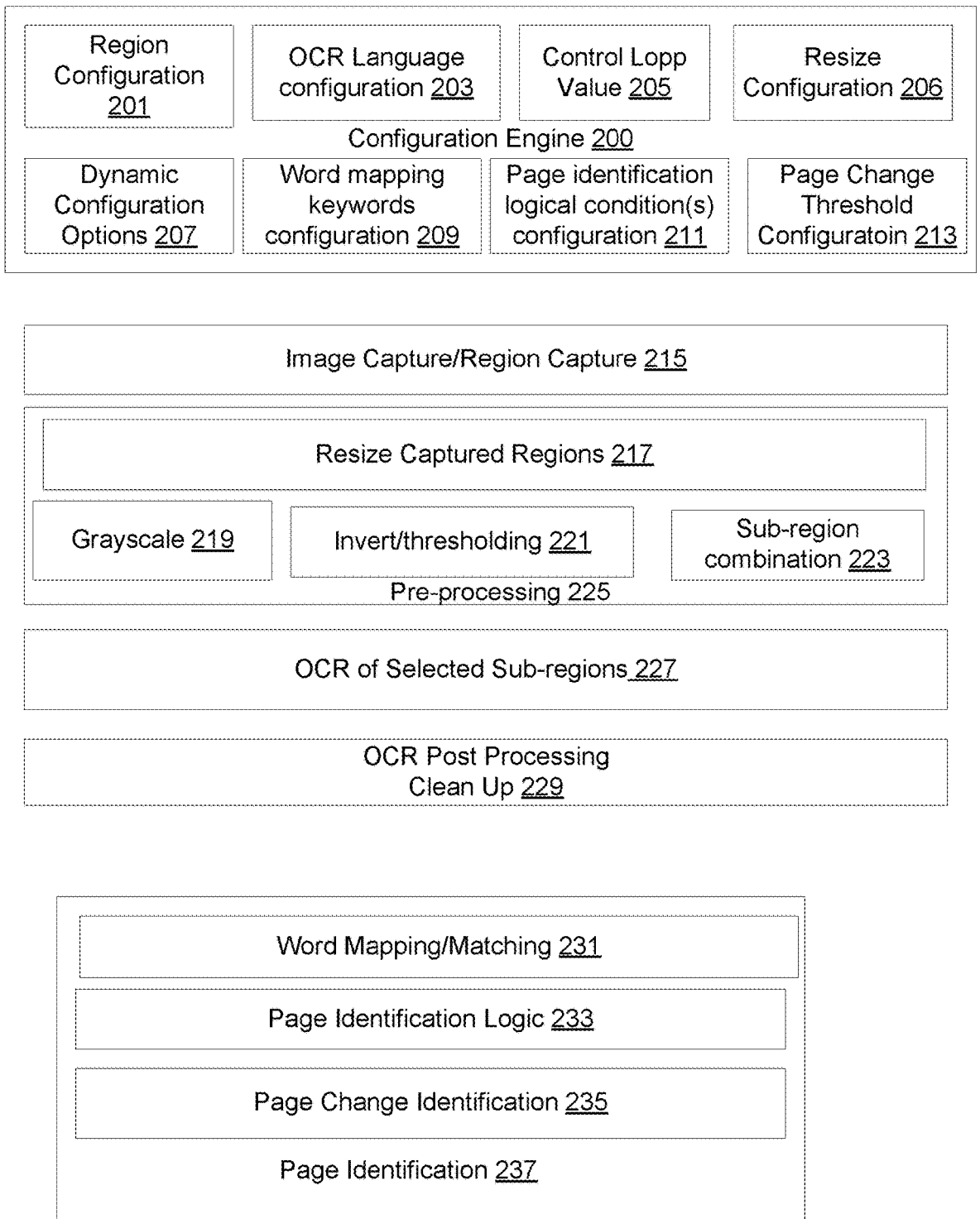
FIG. 2 illustrates an example of modules for page identification in accordance with an implementation.

FIG. 2 illustrates in more detail an example of modules of an identification engine in accordance with an implementation. A configuration engine 200 supports an administrator configuring settings. For example, it may support an administrator configuring regions for OCR in module 201, configuring the OCR language in block 203, setting a control loop value in block 205, configuring resize options in block 206, configuring selected keywords for word mapping in block 209, configuring one or more logical conditions in block 211, and page change threshold configuration in block 213. The extent that access to attributes of the application 101 and the platform of the user's computer are accessible, one or more dynamic configuration options may be supported, such as adapting operation if page title information is available, adapting operation based on available CPU resources, etc.

An image capture/region capture module 215 captures image screenshots for the configured regions. Module 217 resizes the captured regions to address the issue of small font sizes. Pre-processing module 225 may include a grayscale module 219, invert/thresholding module 221 converts text into black text on a white background, and sub-region combination 223 module combines the regions into one group for subsequent processing. OCR of the combined sub-regions is performed in module 227. OCR post-processing cleanup is performed in module 229.

In one implementation, page identification engine 237 includes a word mapping module to match words generated from the post-processed OCR to keywords. Page identification logic 233 performs at least one logical test to identify the page based on the words. Page change identification logic 235 determines from changes in detected words if a page change has occurred.

Figure 3:
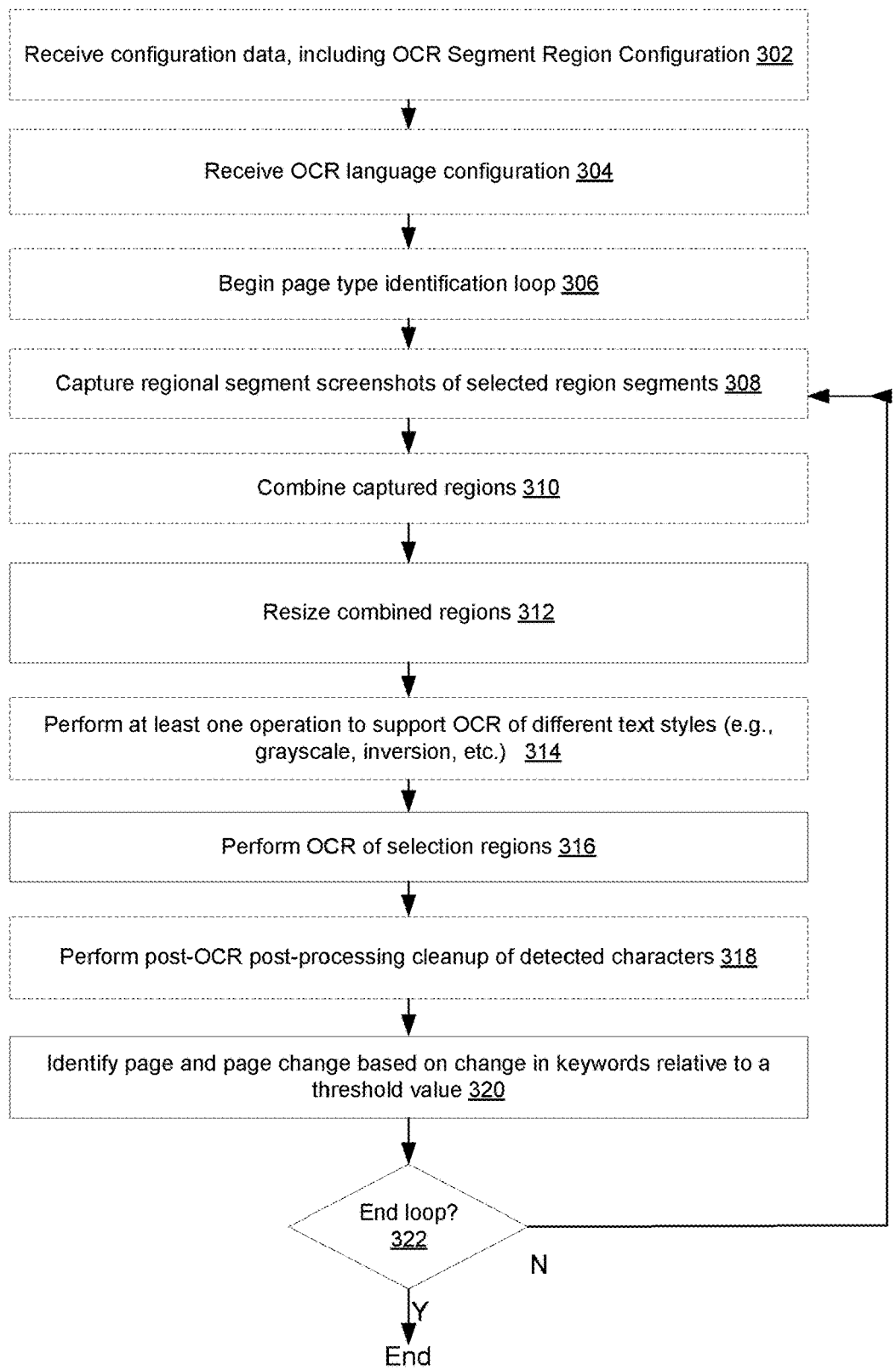
FIG. 3 is high-level flow chart of a method of page identification in accordance with an implementation.

FIG. 3 is a flow chart of a method in accordance with an implementation. In this example, it's assumed that configuration data was previously set by an administrator. During operation, the process receives configuration data and then performs a sequence of steps in a loop to identify pages and page changes. In block 302, the OCR segment configuration is received that defines the rectangular regions of the visual UI for which OCR is to be performed. In block 304, the OCR language configuration is received. Other optional configuration settings could also be received. Alternatively, default values of other configuration settings could be used. In block 308, a processing loop begins, which in one implementation may continue as long as the target application and the DAP player do not quit. In block 308, regional segment image screenshots are captured in the configured regions. The order of some pre-processing steps may be varied. The pre-processing includes combining captured regions in block 310. In block 312, the combined regions are resized to improve OCR accuracy. In block 314, at least one operation is performed to support OCR of different text styles, such as white letters on a black background. This may include performing a grayscale conversion, inverting and thresholding to generate black text on a white background. In block 316, OCR is performed on the pre-processed captured regions. In block 318, OCR post-processing is performed to cleanup detected characters. In block 320, the page is identified, and page changes may also be identified. A decision is made in decision block 322 whether to continue the loop.

Figure 4:
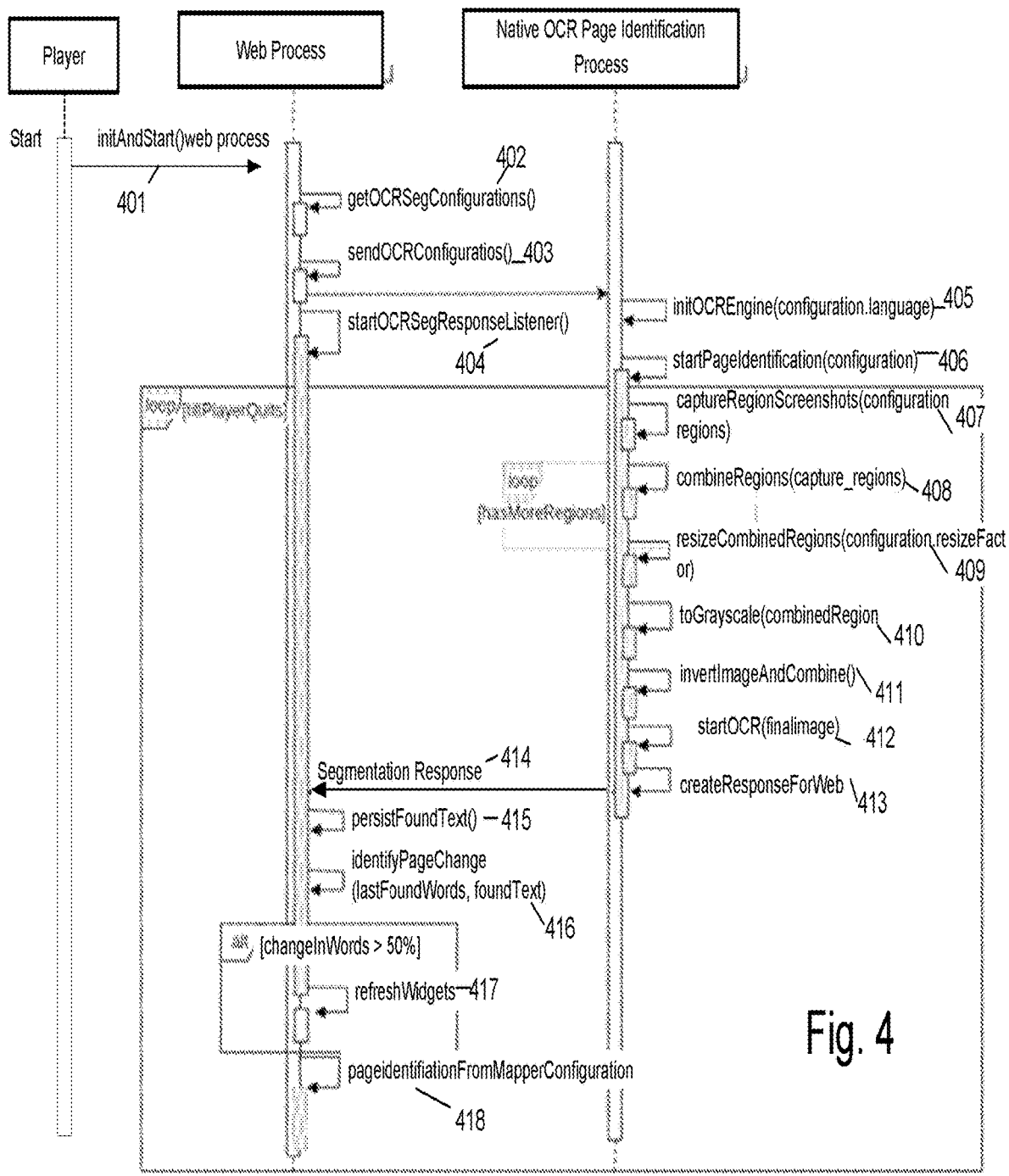
FIG. 4 is an interaction diagram illustrating a process of page identification in accordance with an implementation.

FIG. 4 illustrates an example of a sequence of interactions between a DAP player, a web process, and an OCR page identification process in accordance with an implementation. As indicated by arrow 401, the play may issue a command to initialize and start a web process. As indicated by arrows 402 and 403, the web process may issue commands to get and send OCR configurations to the OCR page identification and, as illustrated by arrow 404, the web process can start to listen for an OCR segment response. The OCR page identification process goes through a sequence of operations in a loop to generate page identification information and page change information. As indicated by arrow 405, the OCR page identification process initializes an OCR engine process to configure the language. In arrow 406, the process starts the page identification according to the configuration settings. As illustrated by arrow 407, screenshots of the configured regions are captured. As illustrated by arrow 408, the captured screenshot regions are combined. As illustrated by arrow 409, the combined, captured screenshot regions are resized by a resize factor. As illustrated by arrow 410, a grayscale process is then implemented, followed by an inversion operation to aid in distinguishing text from its background. This generates a final image, upon which OCR is performed in arrow 412. OCR post-processing may optionally be employed. As indicated by arrows 413 and 414 a segmentation response is created and sent to the web process. The web process persists the found text in arrow 415 and identifies changes in words from the last found words in arrow 416. A determination is made in arrow 417 if the change in words is greater than a threshold percentage, corresponding to a page change. In arrow 418, page identification is performed by mapping (matching) keywords with respect to a mapping configuration (e.g., keywords and logical conditions defining a page identification).

Figure 5:
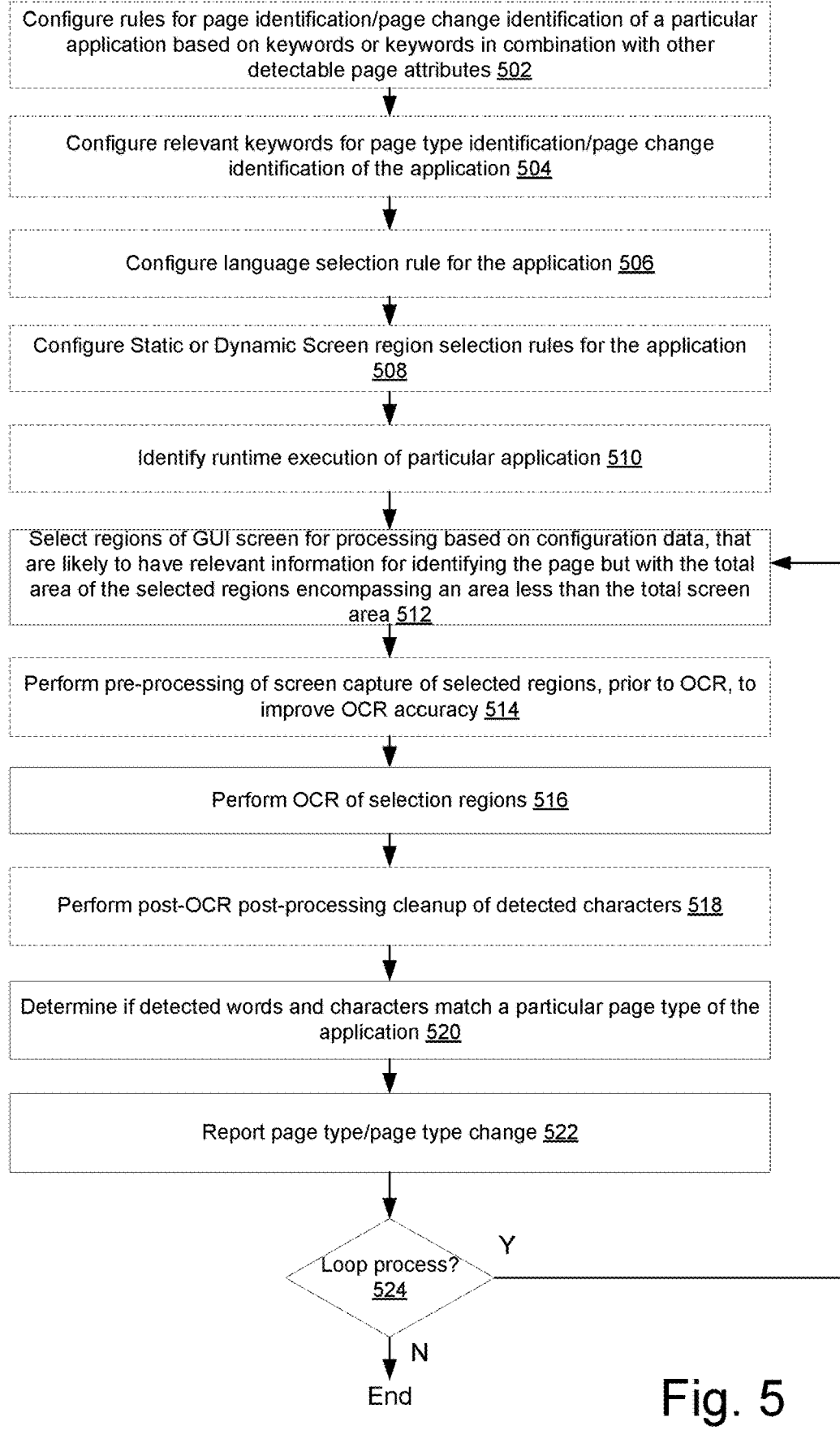
FIG. 5 is a flow chart of a method of page identification in accordance with an implementation.

FIG. 5 is a flow chart for an alternate implementation. In some implementations, the configuration can be dynamic. For example, the configuration may adapt to any additional information that is accessible about the platform, the target application, and the manner the user is using the application the DAP. For example, the loop period might be increased for a user who slowly browses each page in order to reduce CPU usage when CPU resources are limited. While a static configuration is one option with OCR performed on all the configured regions, more generally there could be options provided to vary the configured region size based on CPU resources and platform resources. For example, if there are ample CPU and platform resources, the configured region size may be increased for applications in which that might reduce an error rate in page identification. As another example, while a static region configuration may be used, more generally, the region configuration could be adapted if there are detectable attributes for a page, such as a page title, that could be used in combination with OCR detected words to identify a page. For example, if there are detectable page attributes indicative of the page context, it might be possible in some cases to reduce size of the configured regions upon which OCR is performed in order to identify a page.

In block 502, rules are configured for page identification and page change identification for an application. This may be based on detected keywords alone, or in combination with other detectable page attributes. In block 504, relevant keywords are configured for keyword matching/mapping. In block 506, the language is selected for the application. In block 508, a configuration is made of static or dynamic screen region configuration for the application.

In block 510, the configured page identification process is initiated and started. In block 512, regions of the GUI screen are selected for processing based on the configuration data, with the total regions less than the total screen area. In block 514, preprocess is performed of screen captured regions, such as resizing, grayscale, and inversion. In block 516, OCR is performed on the pre-processed regions. In block 518, post-processing of the OCR characters. In block 520, a determination is made if detected words match a particular page of the application. In block 522, the page/page change is reported. A decision is made in decision block 524 whether to continue the loop.

In one embodiment, the regions on which OCR are to be performed are specified by a configuration administrator using a percentage from the left, a percentage from the top, and a width and a height. This defines a rectangular shaped region and its position with respect to the top left corner of the screen.

Figure 6:
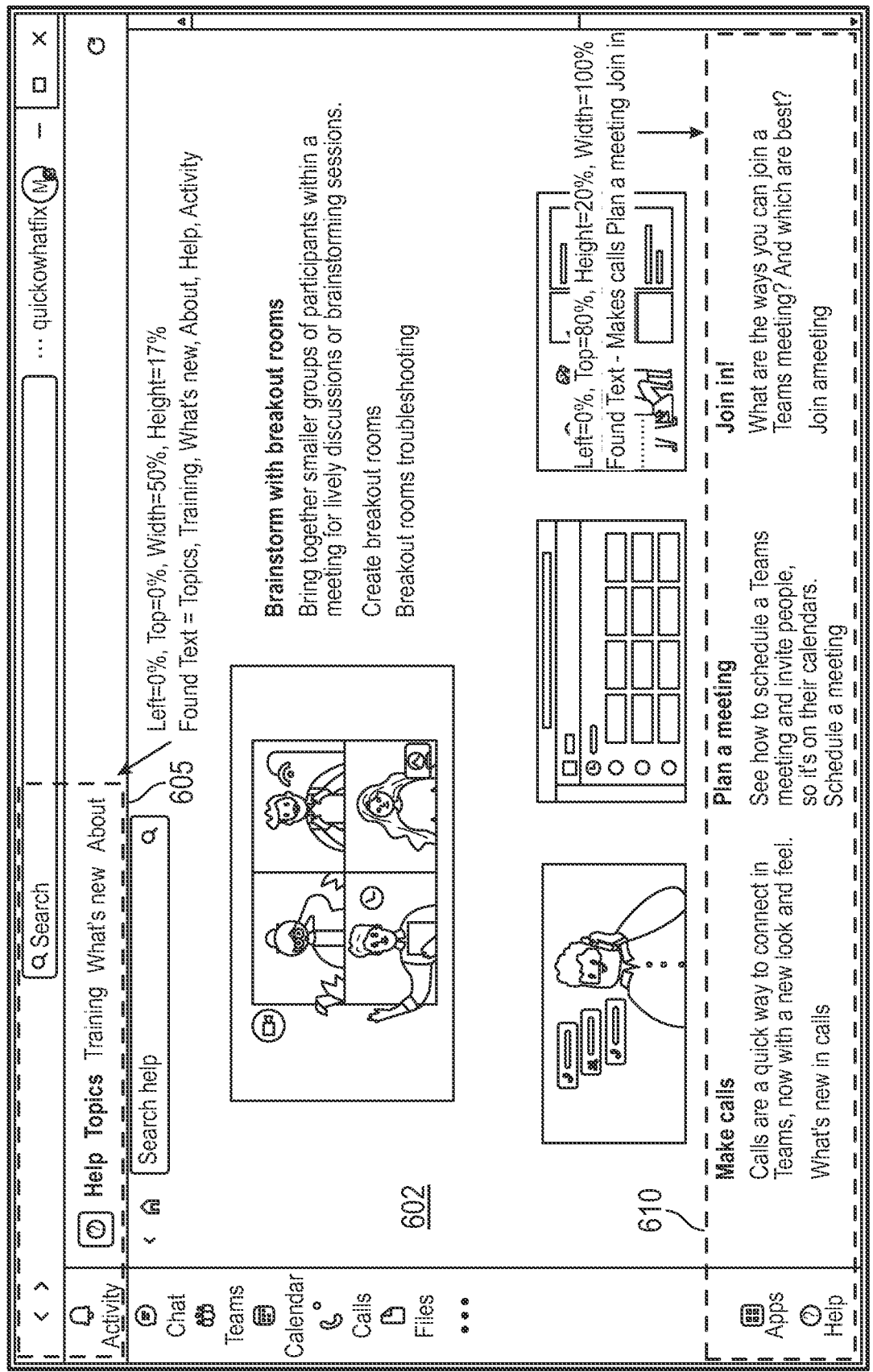
FIG. 6 illustrates an example of a user interface screen and two regions of the screen configured for OCR in accordance with an implementation.

FIG. 6 illustrates an example of UI screen 602 showing an overlay of configured regions for which OCR will be performed. Region 605 is in the top left of the UI screen. Region 610 is in the bottom of the screen. In this example, region 605 encompasses UI help fields with found text Help, topics, training, what's new, about, and activity. Region 605 corresponds to Left=0%, top=0%, width=50%, and height=17%. Region 610 provides information about several features. Region 610 has coordinates left=0%, top=8-%, height=20%, and width=100%. The found text includes make calls, plan a meeting, and join in. In the example of region 610, region 610 includes some words that do not aid in uniquely identifying the page, and thus wouldn't be used in page mapping.

Figure 7:
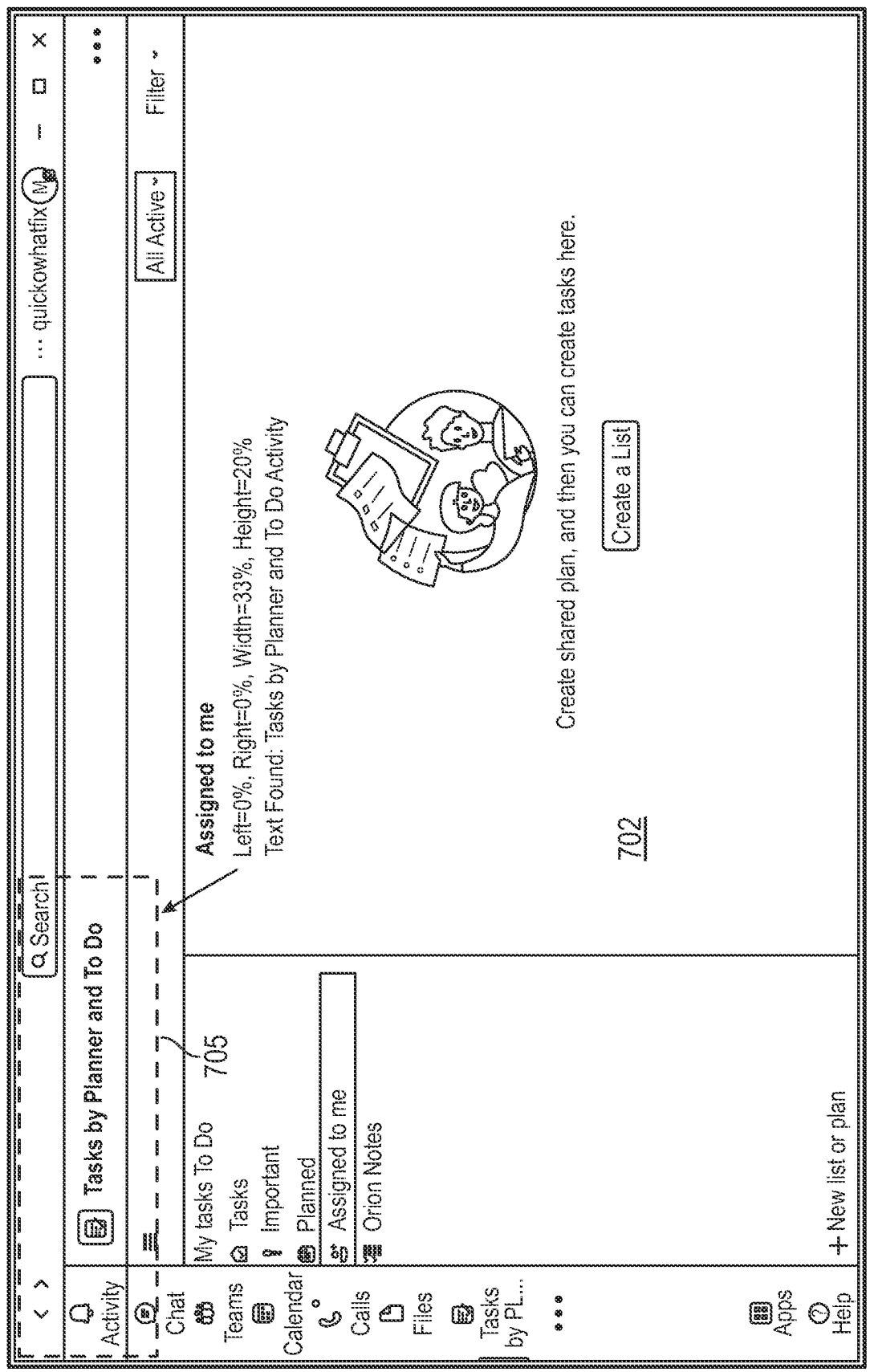
FIG. 7 illustrates an example of a user interface screen and a single region of the screen configured for OCR in accordance with an implementation.

FIG. 7 illustrates an example of tasks UI page 702. Region 705 is at left=0%, top=0%, width=33%, and height=20%. In this example, the found text is tasks by planner and to do. In this example, the size of region 705 is dramatically small that the total overall screen area.

Figure 8:
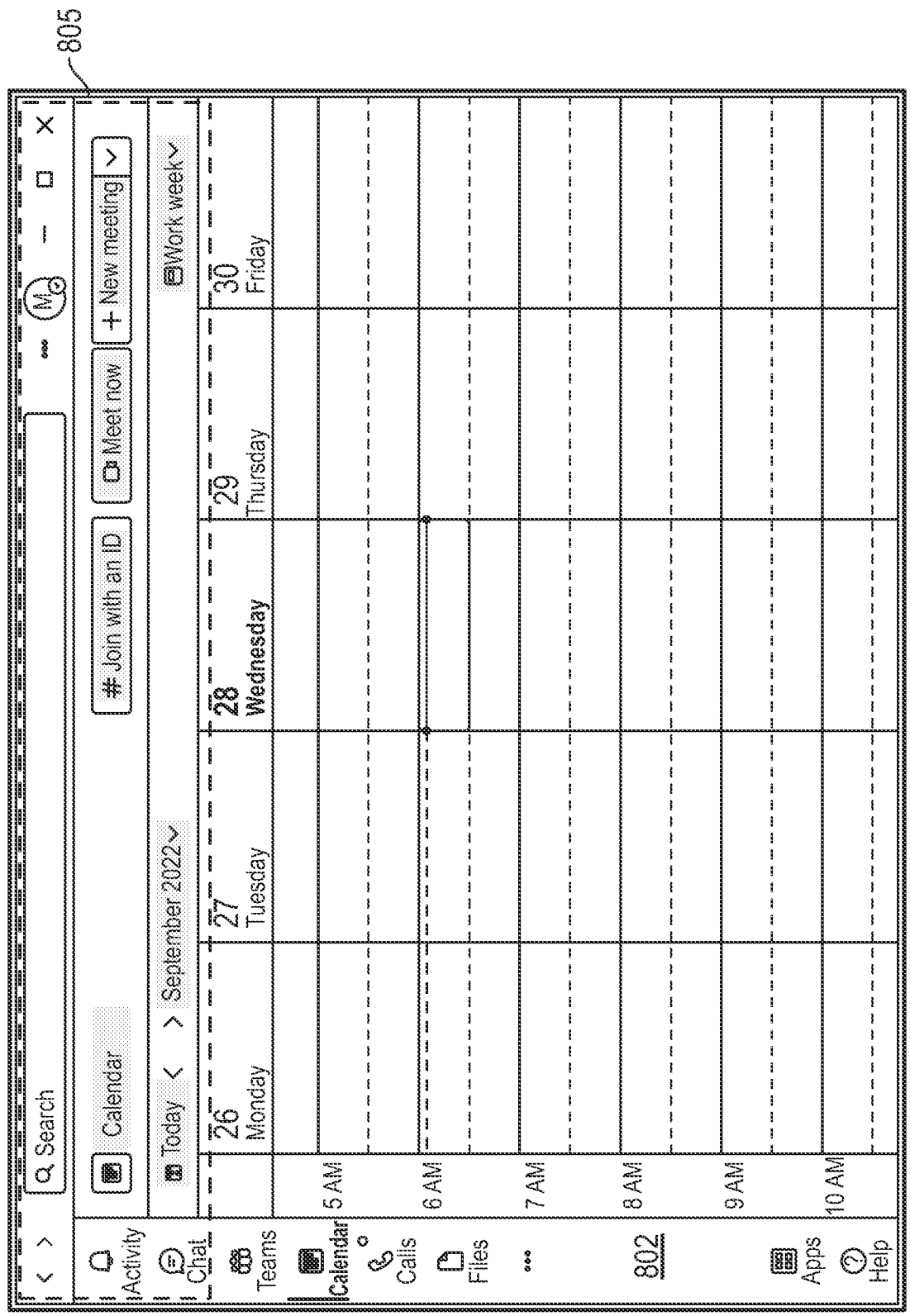
FIG. 8 illustrates an example of a user interface screen and a single region of the screen configured for OCR in accordance with an implementation.

FIG. 8 illustrates UI screen 802 for a calendar. Region 805 is at left 0%, top 0%, width 100% and height 25%. It encompasses the portion of the UI screen in which words identifying the UI screen as a calendar page are found such as calendar, today, September, meet now, work week, etc.

Figure 9:
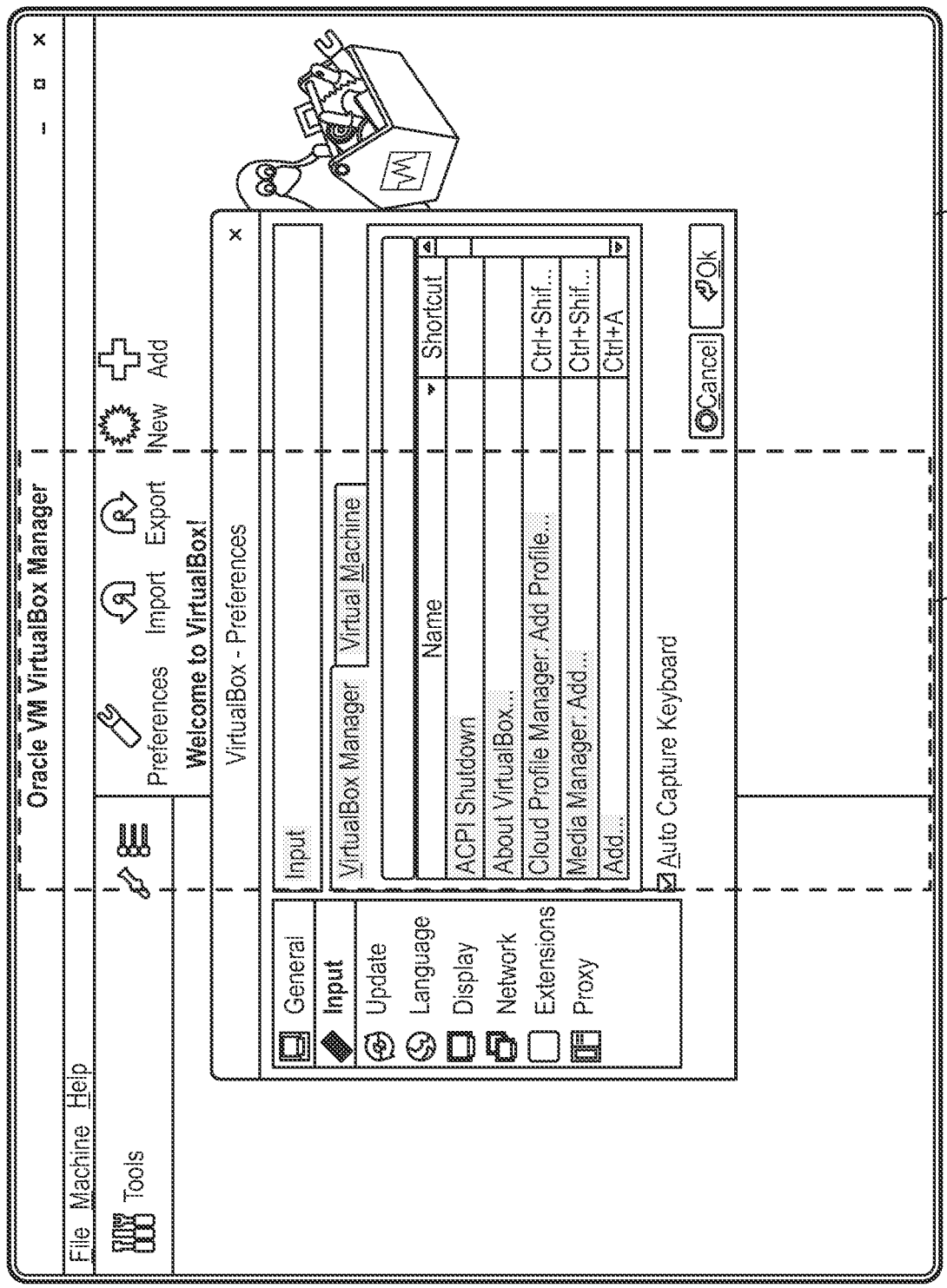
FIG. 9 illustrates an example of a user interface screen and a single region of the screen configured for OCR in accordance with an implementation.

FIG. 9 illustrates a UI screen 902 for a Virtual Box! Manager. In this example, region 905 encompasses found text associated with the Virtual Box such as input, Virtual Box Manager, Virtual Machine, ACPI Shutdown, About Virtual Box, Cloud Profile Manager, Media Manager, and Add.

Figure 10:
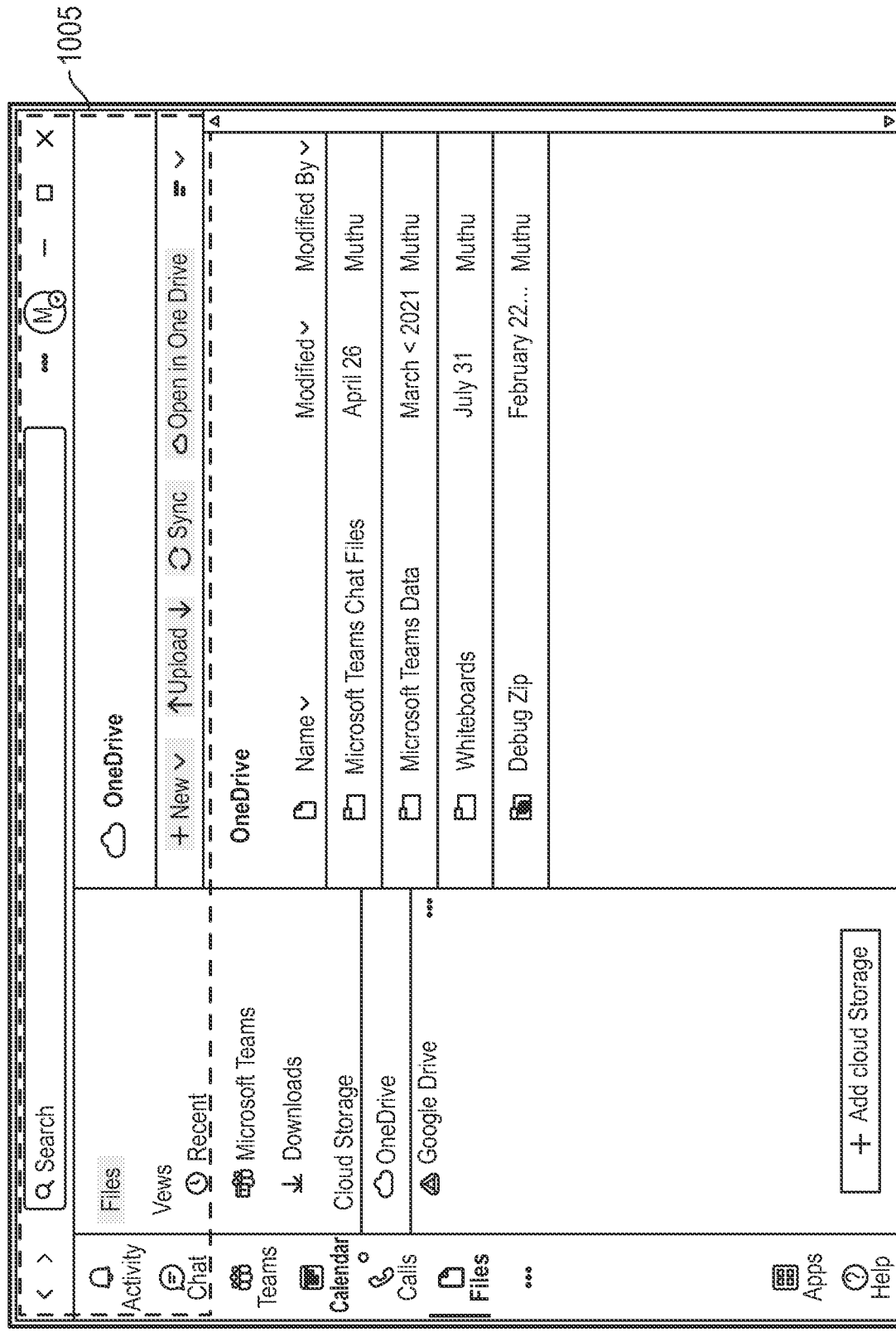
FIG. 10 illustrates an example of a user interface screen and a single region of the screen configured for OCR in accordance with an implementation.

FIG. 10 illustrates a UI screen 1002 for a OneDrive. Region 1005 encompasses found text such as files, new, upload, open, sync, and drive.

Figure 11A:
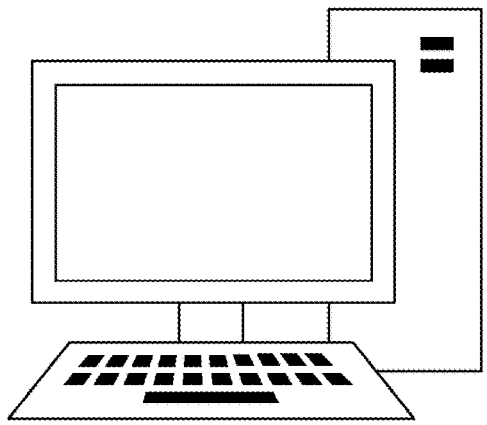
FIGS. 11A and 11B illustrate a general computer environment for deploying the page identification technique in accordance with an implementation.
Figure 11B:
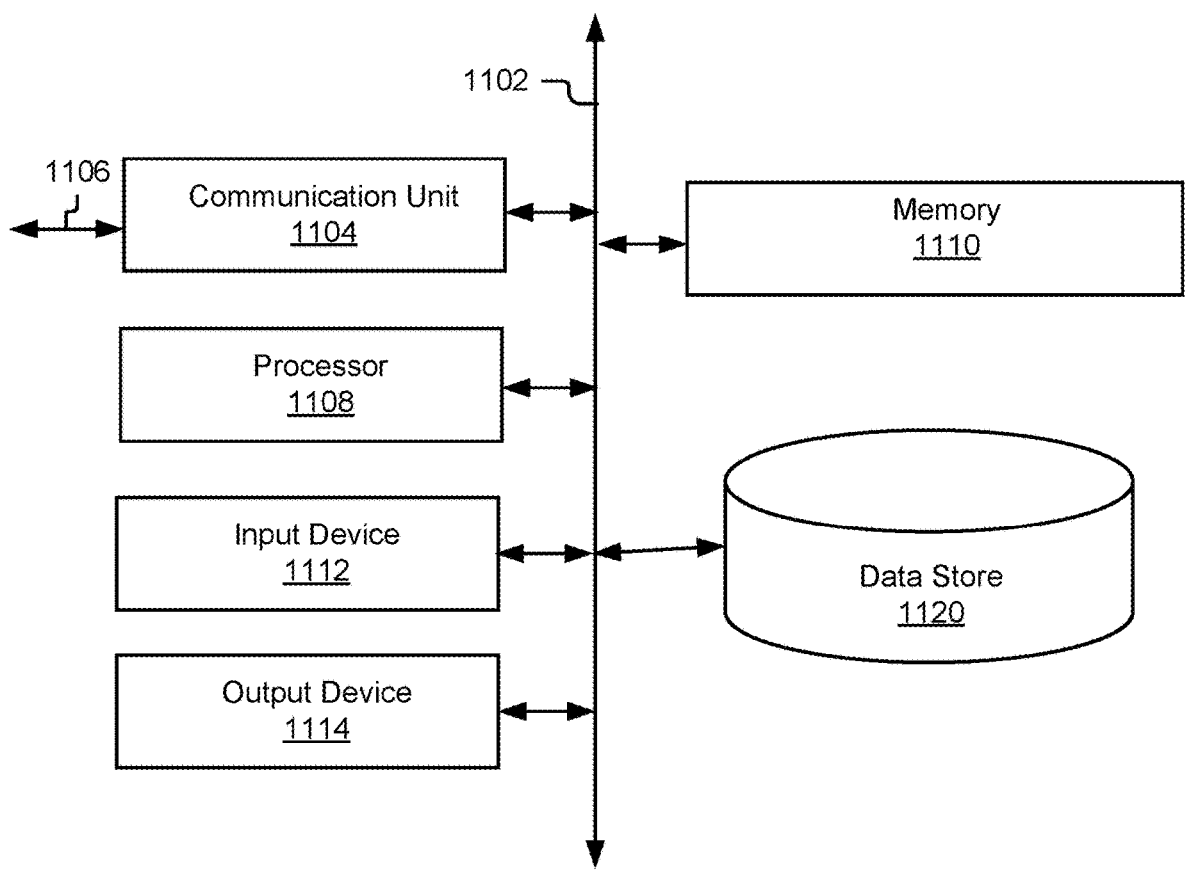

The page identification engine 106 may be implemented as software instructions executing on a user's computer. It may, for example, be implemented to operate with other software on a user's desktop. Referring to FIG. 11A, the software instructions may be stored on a user's computer, which may in turn have conventional hardware components such as a memory 1110, data store 1120, output device 1114 (e.g., a display screen), an input device 1112, a processor 1108, and a communication unit 1104 to communicate with a computer network, such as a LAN, WAN, the internet, etc.

One of the benefits of the technique is that because it utilizes OCR, it is agnostic to many of the implementation details of the target application. It works with MS automation, API compliant applications, SAP applications, Java applications, applications working inside a remote desktop, and Citrix environments.

In the above description, for purposes of explanation, numerous specific details are set forth to provide a thorough understanding of the present disclosure. However, the technology described herein can be practiced without these specific details. Further, various systems, devices, and structures are shown in block diagram form to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like New, Upload, Sync, and Open in One Drive.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method of operating a digital adoption platform (DAP) to provide content to assist a user of a graphical user interface (GUI) of a target application, comprising:
   identifying, for a current display screen of the target application, a page type based on detecting a match of a pattern of words associated with a particular page type, and in response generating a page type identifier;
   providing the page type identifier to the DAP for the DAP to determine the page type of the current display screen of the GUI of the target application being displayed and select help tips for the current page type to provide guidance as the user navigates through the target application; and
   wherein the identification of the page type for DAP is agnostic to user interface (UI) implementation and UI automation implementation details of the target application.

2. A page identification system, comprising:
   a configuration engine to configure at least one region of an application display screen of a graphical user interface (GUI) of an application for Optical Character Recognition (OCR), wherein the at least one region encompasses a screen area no greater than 75% of a maximum screen area;
   an OCR module to perform OCR of a screen capture image of the at least one region to detect words found in the at least one region;
   a page identification module to identify a page of the application based on a match of the detected words to a word map, using one or more logical conditions, to generate a page identifier;
   wherein the system provides a page identifier to a digital adoption platform (DAP) for the DAP to determine a page of a current display screen of the GUI of the application and select help tips to provide guidance as the user navigates through different pages of a target application; and wherein the identification of the page for DAP is agnostic to UI implementation and UI automation implementation details of the target application.

3. The page identification system of claim 2, further comprising a pre-processing module to perform pre-processing of the at least one region prior to performing OCR.

4. The page identification system of claim 3, wherein the pre-processing module performs a resizing to increase the minimum font size.

5. The page identification system of claim 3, wherein the pre-processing module combines individual screen capture images of each region of the at least one region.

6. The page identification system of claim 3, wherein the pre-processing module performs at least one operation to distinguish text from its background.

7. The page identification system of claim 6, wherein the at least one operation comprises performing grayscale conversion, inversion, and thresholding.

8. The page identification system of claim 2, further comprising a post-processing module to perform post-processing of an output of the OCR including cleaning up the OCR output and generating an array of words.

9. The page identification system of claim 2, wherein the page identification module comprises a mapping module to detect the page based on the detected words.

10. A method of identifying page information for a graphical user interface (GUI) of a target application to facilitate a digital adoption platform (DAP) providing contextual guidance of the target application, comprising:

configuring at least one region of an application screen for Optical Character Recognition (OCR), wherein the at least one region encompasses a screen area no greater than 75% of a maximum screen area to reduce CPU resource requirements during runtime operation of the digital adoption platform;

performing pre-processing of a screen capture image of the at least one region prior to performing OCR, wherein the pre-processing includes at least one member of the group of operations consisting of: 1) performing a resizing to increase a minimum font size, 2) combining individual screen capture images of each region of the at least one region, and 3) performing at least one operation to distinguish text from its background;

performing OCR of the pre-processed screen capture image to detect words found in the at least one region;

performing post-processing of an output of the OCR to generate an array of words;

identifying a page type based on a match of the detected words to a word map using one or more logical conditions; and providing the page type to the digital adoption platform to enable the digital adoption platform to determine a display screen page the user is currently viewing and present contextually relevant tool tips to guide a user through the display screens of the target application;

wherein the identification of the page type for DAP is agnostic to UI implementation and UI automation implementation details of the target application.

11. The method of claim 10, further comprising identifying a page change based on a distance algorithm having a pre-selected threshold of a change in text, wherein the pre-selected threshold is set to detect when a page change occurs, and wherein the page change detection triggers the digital adoption platform to update the contextually relevant tooltips in response to the page change.

12. The method of claim 10, wherein the digital adoption platform uses the identified page information to select appropriate help tips from content providers that correspond to specific user interface elements on the identified page.

* * * * *